(12) United States Patent
Wang et al.

(10) Patent No.: US 11,732,874 B2
(45) Date of Patent: Aug. 22, 2023

(54) LIGHT STRIP, BACKLIGHT MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Boning Wang, Beijing (CN); Gang Liu, Beijing (CN); Jian Ren, Beijing (CN); Jiantao Liu, Beijing (CN); Li Tian, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/761,554

(22) PCT Filed: May 19, 2021

(86) PCT No.: PCT/CN2021/094522
§ 371 (c)(1),
(2) Date: Mar. 17, 2022

(87) PCT Pub. No.: WO2021/258928
PCT Pub. Date: Dec. 30, 2021

(65) Prior Publication Data
US 2022/0364711 A1    Nov. 17, 2022

(30) Foreign Application Priority Data
Jun. 24, 2020    (CN) .......................... 202021202702.5

(51) Int. Cl.
*F21V 19/00*        (2006.01)
*F21K 9/20*         (2016.01)
(Continued)

(52) U.S. Cl.
CPC ............ *F21V 19/0025* (2013.01); *F21K 9/20* (2016.08); *F21V 33/0052* (2013.01);
(Continued)

(58) Field of Classification Search
CPC .... F21V 19/0025; F21V 33/0052; F21K 9/20; G02F 1/1336; G02F 1/133615
See application file for complete search history.

(56) References Cited

U.S. PATENT DOCUMENTS

2013/0242538 A1*  9/2013  Huang ................... G09F 13/04
                                                362/249.02
2016/0252218 A1   9/2016  Fujikawa et al.

FOREIGN PATENT DOCUMENTS

CN    102606937 A    7/2012
CN    205679886 U   11/2016
(Continued)

OTHER PUBLICATIONS

PCT/CN2021/094522 international search report and written opinion.

*Primary Examiner* — Evan P Dzierzynski
*Assistant Examiner* — Nathaniel J Lee
(74) *Attorney, Agent, or Firm* — IPro, PLLC (57) ABSTRACT

The present disclosure provides a light strip, including a circuit board. A plurality of LEDs is arranged on the circuit board and spaced apart from each other in an extension direction of the circuit board, a positive connection end and a plurality of negative connection ends are arranged on the circuit board, and a plurality of LEDs is coupled between each negative connection end and the positive connection end. A plurality of LEDs between the first negative connection end and the positive connection end includes a head-end LED and a tail-end LED. The plurality of LEDs between the first negative connection end and the positive connection end includes a first LED and a second LED arranged at (Continued)

opposite sides of a first position in the extension direction of the circuit board. The present disclosure further provides a backlight module and a display module.

17 Claims, 4 Drawing Sheets

(51) Int. Cl.
*F21V 33/00* (2006.01)
*G02F 1/13357* (2006.01)
*F21Y 103/10* (2016.01)
*F21Y 115/10* (2016.01)

(52) U.S. Cl.
CPC ...... *G02F 1/1336* (2013.01); *G02F 1/133615* (2013.01); *F21Y 2103/10* (2016.08); *F21Y 2115/10* (2016.08)

(56) References Cited

FOREIGN PATENT DOCUMENTS

| | | | |
|---|---|---|---|
| CN | 205942205 U | | 2/2017 |
| CN | 208596273 U | * | 3/2019 |
| CN | 208596273 U | | 3/2019 |
| CN | 212112067 U | | 12/2020 |
| JP | 2016162829 A | | 9/2016 |

* cited by examiner

Fig. 12

# LIGHT STRIP, BACKLIGHT MODULE AND DISPLAY DEVICE

CROSS-REFERENCE TO RELATED APPLICATION

This application is the U.S. national phase of PCT Application No. PCT/CN2021/094522 filed on May 19, 2021, which claims a priority of the Chinese patent application No. 202021202702.5 filed on Jun. 24, 2020, which is incorporated herein by reference in its entirety.

TECHNICAL FIELD

The present disclosure relates to the manufacture of a display product, in particular to a light strip, a backlight module and a display device.

BACKGROUND

Light-Emitting Diode (LED) light strip is a light source of a backlight module. In order to improve a service life of a display device, an electro-static discharge test needs to be performed on the backlight module. An antistatic ability of the product is relevant to a magnitude of static electricity applied to a to-be-tested position and the to-be-tested position. A maximum magnitude of the static electricity withstood by the product at a weak position is used to evaluate the antistatic ability of the product. A fixed weak position of the product has been determined in the industry. For an iron-frame product, an aperture of an iron frame is the weak position. When the product has any design defect and the static electricity is applied to the weak position, LEDs will be turned off.

SUMMARY

An object of the present disclosure is to provide a light strip, a backlight module and a display device, so as to solve the problem in the related art where an LED are not normally lightened at the weak position.

In one aspect, the present disclosure provides in some embodiments a light strip, including a circuit board. A plurality of LEDs is arranged on the circuit board and spaced apart from each other in an extension direction of the circuit board, the circuit board is provided with a positive connection end and a plurality of negative connection ends, a plurality of LEDs is coupled between each negative connection end and the positive connection end, each LED includes a first electrode and a second electrode, the plurality of negative connection ends includes a first negative connection end, and a plurality of LEDs between the first negative connection end and the positive connection end includes a head-end LED, an tail-end LED and a plurality of intermediate LEDs between the head-end LED and the tail-end LED. A first electrode of the head-end LED is electrically coupled to a second electrode of the tail-end LED, the first electrode is a positive electrode, and the second electrode is a negative electrode. The plurality of LEDs between the first negative connection end and the positive connection end includes a first LED and a second LED arranged at opposite sides of a first position in the extension direction of the circuit board, a second electrode of the first LED is coupled to the first negative connection end, and a first electrode of the second LED is coupled to the positive connection end.

In a possible embodiment of the present disclosure, the first negative connection end is a first one of the negative connection ends or a last one of the negative connection ends in the extension direction of the circuit board.

In a possible embodiment of the present disclosure, the first negative connection end is a first one of the negative connection ends in the extension direction of the circuit board, and the second LED is the head-end LED.

In a possible embodiment of the present disclosure, the first negative connection end is a last one of the negative connection ends in the extension direction of the circuit board, and the second LED is the tail-end LED.

In a possible embodiment of the present disclosure, the positive connection end and the negative connection end are arranged at a same side of the circuit board in the extension direction of the circuit board.

In a possible embodiment of the present disclosure, the plurality of LEDs is arranged at a regular interval on the circuit board in the extension direction of the circuit board.

In a possible embodiment of the present disclosure, the plurality of negative connection ends includes a second negative connection end different from the first negative connection end, and a plurality of LEDs between the positive connection end and the second negative connection end is sequentially coupled in series to each other in the extension direction of the circuit board.

In a possible embodiment of the present disclosure, a plurality of LEDs is arranged on a first surface of the circuit board, a positive line coupled to the positive connection end is arranged on the first surface, and a plurality of negative lines coupled to the negative connection ends respectively is arranged on a second surface of the circuit board opposite to the first surface.

In another aspect, the present disclosure provides in some embodiments a backlight module including the above-mentioned light strip.

In yet another aspect, the present disclosure provides in some embodiments a display device including the above-mentioned backlight module.

The present disclosure has the following beneficial effects. Through changing a connection mode of the plurality of LEDs between a first negative line and the positive line, it is able to disperse static electricity to more LEDs, thereby to improve the antistatic ability and lighten the LEDs normally.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

Figure 1:
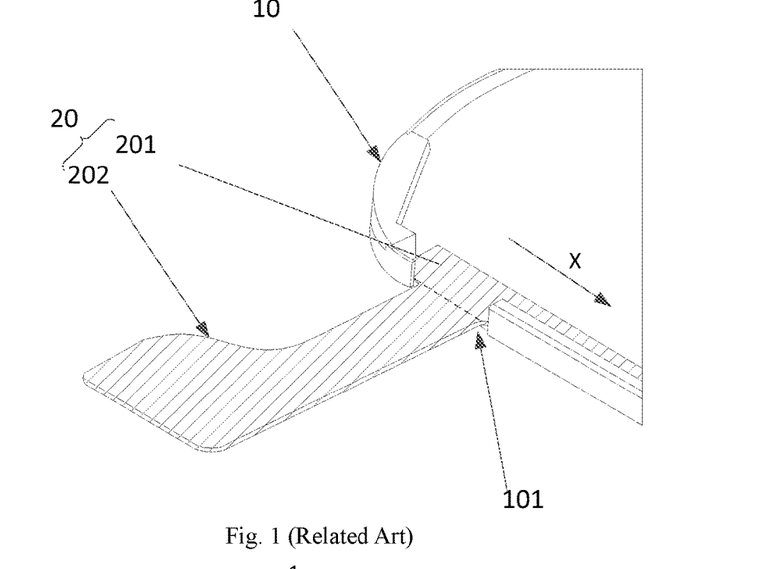
FIG. 1 is a schematic view showing an iron frame in the related art.
Figure 2:
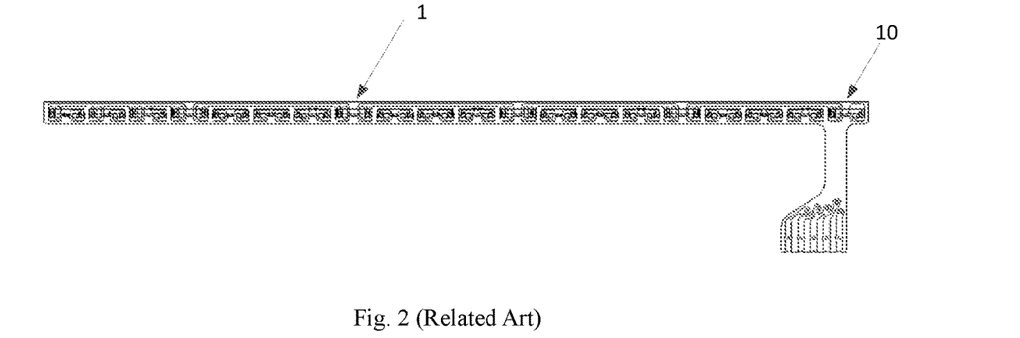
FIG. 2 is a schematic view showing a light strip in the related art.
Figure 3:
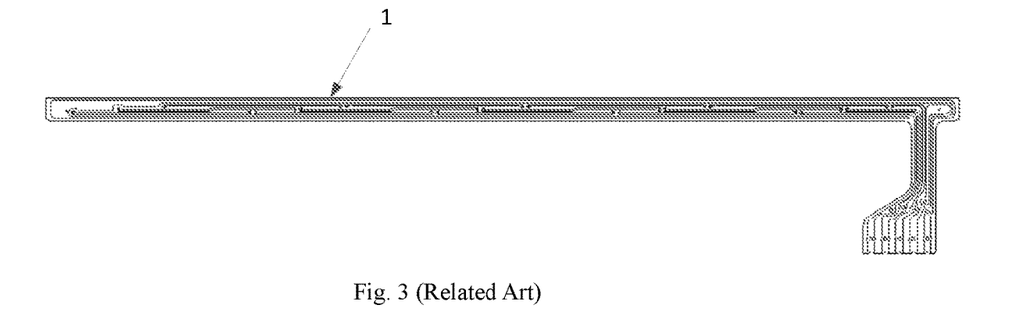
FIG. 3 is a schematic view showing a wiring mode at a back surface of the light strip in FIG. 2.
Figure 4:
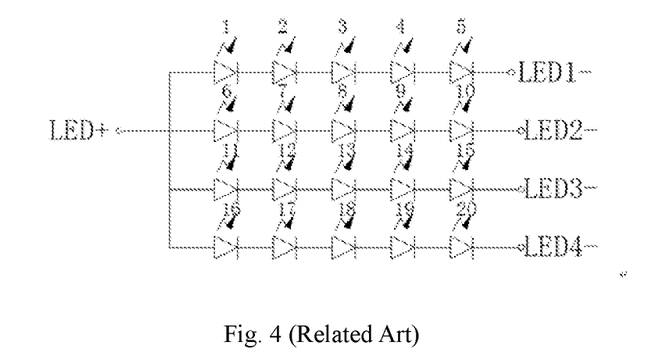
FIG. 4 is a schematic view showing a connection mode of LEDs of the light strip in the related art.
Figure 5:
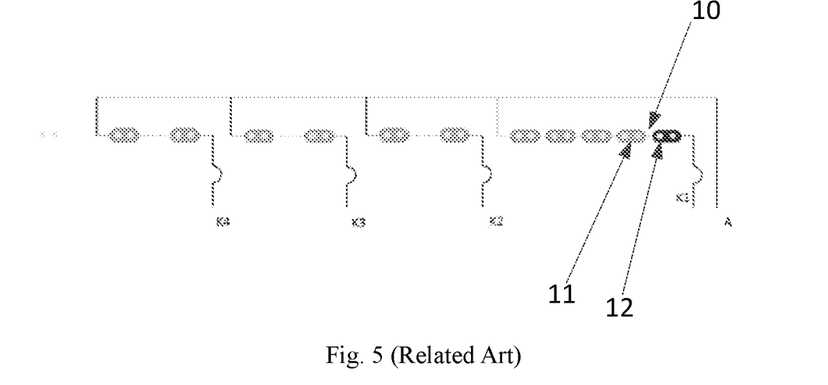
FIG. 5 is a schematic view showing an equivalent circuit of the light strip in the related art.
Figure 6:
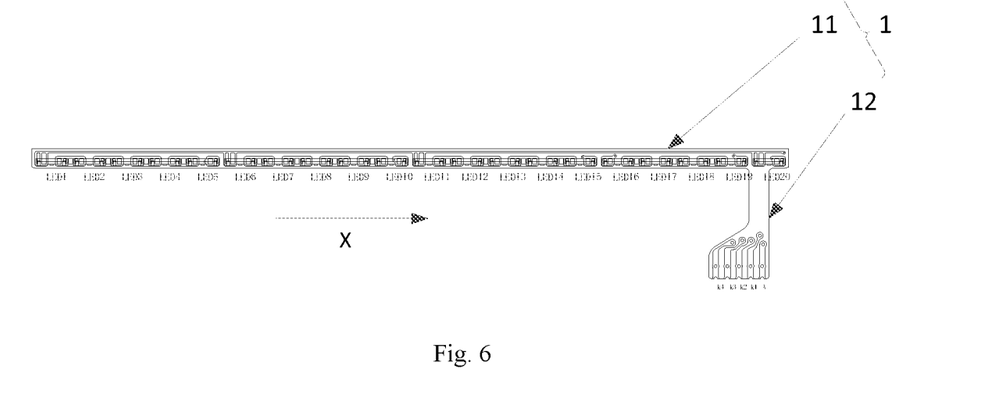
FIG. 6 is a schematic view showing a light strip according to one embodiment of the present disclosure.
Figure 7:
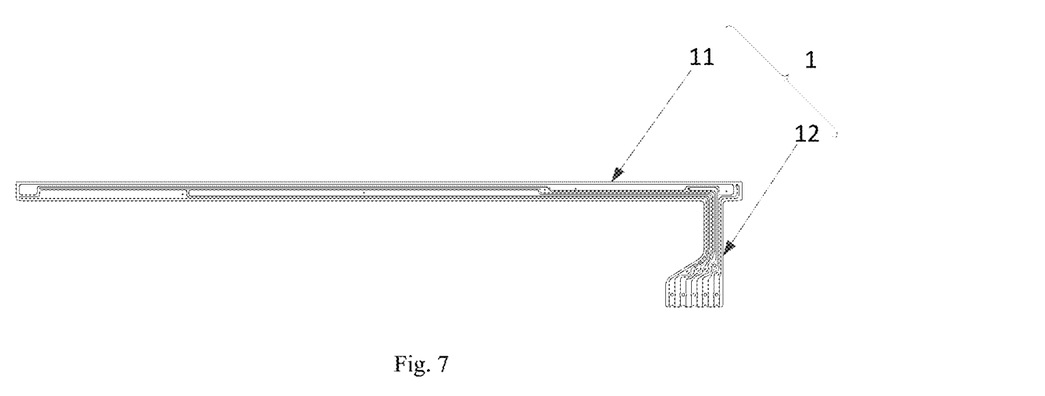
FIG. 7 is a schematic view showing a wiring mode at a back surface of the light strip in FIG. 6.

A maximum magnitude of static electricity withstood by a product at weak position is used to evaluate an antistatic ability of the product. A fixed weak position has been determined in the industry. For an iron-frame product, an aperture of an iron frame is the weak position. As shown in FIG. 1, a backlight module includes an iron back plate 10, and the iron back plate 10 includes a bottom plate and a side plate. A circuit board 20 of a light strip includes a body member 201 and a connection member 202 coupled to the body member 201 (which are divided by a dotted line in FIG. 1). The body member 201 is provided with a plurality of LEDs, the body member 201 is of a strip-like shape extending in a direction X, the connection member 202 extends from the body member 201 and in a direction perpendicular to the direction X, and the body member 201 and the connection member 202 are coupled to each other to form an L shape. The light strip is assembled with the iron back plate 10, the body member 201 is coupled to the bottom plate, and the connection member 202 extends from an aperture 101 (i.e., the aperture of the iron frame) in the side plate. When the product has a design defect and the static electricity is applied to the aperture, the LEDs will be turned off.

As shown in FIG. 2 to FIG. 5, the LEDs on the circuit board are divided into four groups, and each group includes five LEDs connected in series. During a static electricity test, the static electricity is applied at a first position 10, i.e., a position of the body member 201 intersecting the connection member 202 of the light strip 20 in FIG. 1. Due to a fixed connection mode of the light strip, an arrangement mode of the LEDs remains unchanged, so the first position 10 generally corresponds to a position between a first LED 11 and a second LED 12 in a first group of LEDs in FIG. 5. When the static electricity spreads along a line, a right electrode of the second LED 12 is directly coupled to a negative connection end K1, and a left electrode of the second LED 12 is coupled to four LEDs. That is, the static electricity spreads to the right through only one LED with a total resistance of R, and spreads to the left through four LEDs with a total resistance of 4R. In this regard, in a rightward direction, the antistatic ability of the light strip is poor. When a voltage of the static electricity exceeds 4 KV, the second LED may fail and be turned off.

In order to solve the above problems, the present disclosure provides in some embodiments a light strip which, as shown in FIG. 6 to FIG. 12, includes a circuit board 1. A plurality of LEDs is arranged on the circuit board 1 and spaced apart from each other in an extension direction of the circuit board (direction X in FIG. 5), a positive connection end and a plurality of negative connection ends are arranged on the circuit board, a plurality of LEDs is coupled between each negative connection end and the positive connection end, each LED includes a first electrode and a second electrode arranged opposite to each other, the plurality of negative connection ends includes a first negative connection end, and a plurality of LEDs between the first negative connection end and the positive connection end includes a head-end LED, a tail-end LED and a plurality of intermediate LEDs between the head-end LED and the tail-end LED. A first electrode of the head-end LED is electrically coupled to a second electrode of the tail-end LED, the first electrode is a positive electrode, and the second electrode is a negative electrode. The plurality of LEDs between the first negative connection end and the positive connection end includes a first LED and a second LED arranged at opposite sides of a first position in the extension direction of the circuit board, a second electrode of the first LED is coupled to the first negative connection end, and a first electrode of the second LED is coupled to the positive connection end.

Figure 10:
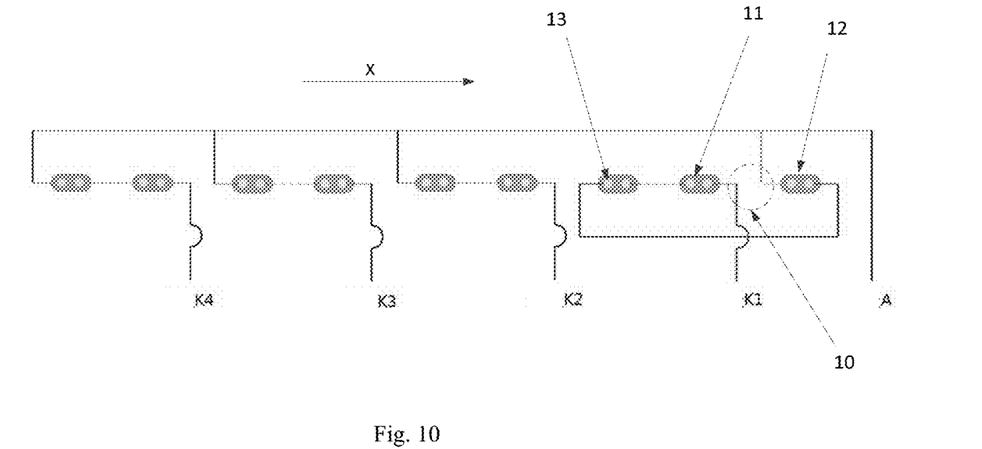
FIG. 10 is a schematic view showing a connection mode of LEDs of the light strip according to one embodiment of the present disclosure.

In the embodiments of the present disclosure, the first electrode and the second electrode of each LED are respectively arranged, but not limited to, at two sides of the LED in the direction X in FIG. 10.

The first electrode is a positive electrode, the second electrode is a negative electrode, and a predetermined current flows from the positive electrode and to the negative electrode so as to lighten a corresponding LED. In the embodiments of the present disclosure, the first electrode of the LED is the positive electrode, and the second electrode of the LED is the negative electrode.

In FIG. 10, the plurality of LEDs between the first negative connection end K1 and the positive connection end A includes a head-end LED 13, a tail-end LED, and a plurality of intermediate LEDs between the head-end LED 13 and the tail-end LED, and the tail-end LED is the second LED 12.

The first position 10 is a static electricity test position. During a static electricity test, static electricity enters at the first position 10, i.e., a position between the first LED 11 and the second LED 12 in FIG. 10, and spreads along a line. A second electrode of the second LED 12 (i.e., the tail-end LED) is coupled to a first electrode of the head-end LED 13, a first electrode of the second LED 12 is coupled to the positive connection end A, and a second electrode of the first LED 11 is coupled to the first negative connection end (negative connection end K1). That is, the first LED 11 is coupled in series to four LEDs and then coupled to the positive connection end A at a side where the first electrode is located, and the second LED 12 is coupled in series to four LEDs and then coupled to the first negative connection end at a side where the second electrode is located. The static electricity spreads to the right (from the first LED 11 to the second LED 12) through five LEDs with a total resistance of 5R, and spreads to the left (from the second LED 12 to the first LED 11) through five LEDs with a total resistance of 5R. In this regard, it is able to improve the antistatic ability in both a leftward direction and a rightward direction.

The antistatic ability of a traditional light strip is less than 4 KV, while the antistatic ability of the light strip in the embodiments of the present disclosure is increased to more than 6 KV.

In the embodiments of the present disclosure, as shown in FIG. 6 to FIG. 9, the circuit board 1 includes a body member 11 extending in the direction X, and a connection member 12 extending from the body member 11 and in a direction perpendicular to the direction X. The connection member 12 and the body member 11 are coupled to each other to form an inverted L shape.

It should be appreciated that, each LED on the circuit board 1 in FIG. 6 to FIG. 12 includes four LED groups coupled in parallel to each other, and each LED group includes five LEDs coupled in series. However, a wiring connection mode is not limited thereto, and the quantity of LED groups and the quantity of LEDs in each LED group may be set according to the practical need.

In the embodiments of the present disclosure, the circuit board 1 is a flexible circuit board.

In the embodiments of the present disclosure, the first negative connection end is a first one of the negative connection ends or a last one of the negative connection ends in the extension direction of the circuit board 1.

The static electricity test position is a static electricity weak position generally arranged at one end in the extension direction of the circuit board 1, the negative connection end arranged at one end in the extension direction of the circuit board 1 is the first negative connection end, and a position of the first negative connection end varies along with the static electricity weak position.

In a possible embodiment of the present disclosure, the first negative connection end is the first one of the negative connection ends in the extension direction of the circuit board 1, and the second LED 12 is the head-end LED in the extension direction of the circuit board 1.

In a possible embodiment of the present disclosure, the first negative connection end is the last one of the negative connection ends in the extension direction of the circuit board 1, and the second LED 12 is the tail-end LED in the extension direction of the circuit board 1.

It should be appreciated that, the static electricity weak position is not limited to be arranged at one end in the extension direction of the circuit board 1, and the position of the first negative connection end is not limited to be the first one of the negative connection ends or the last one of the negative connection ends in the extension direction of the circuit board 1. For example, the static electricity test position is arranged at an intermediate portion of the circuit board, and the negative connection end at the corresponding position is the first negative connection end.

As shown in FIG. 6 to FIG. 12, in the embodiments of the present disclosure, the circuit board 1 includes a positive connection end A and a plurality of negative connection ends (K1, K2, K3, K4) arranged at one end of the circuit board 1 in the extension direction of the circuit board 1.

The positive connection end and the negative connection end may be arranged at any end in the extension direction of the circuit board, and the positive connection end and the negative connection end may be arranged at a same end or at different ends. In a possible embodiment of the present disclosure, in order to facilitate the connection, the positive connection end and the negative connection end are arranged at a same end of the circuit board in the extension direction of the circuit board, and the quantity of the negative connection ends may be set according to the practical need, as shown in FIG. 6 to FIG. 12.

In the embodiments of the present disclosure, the plurality of LEDs is arranged at a regular interval on the circuit board in the extension direction of the circuit board, so as to ensure a display effect.

In the embodiments of the present disclosure, the plurality of negative connection ends includes a second negative connection end different from the first negative connection end, and a plurality of LEDs between the positive connection end and the second negative connection end is sequentially coupled in series in the extension direction of the circuit board 1.

Figure 8:
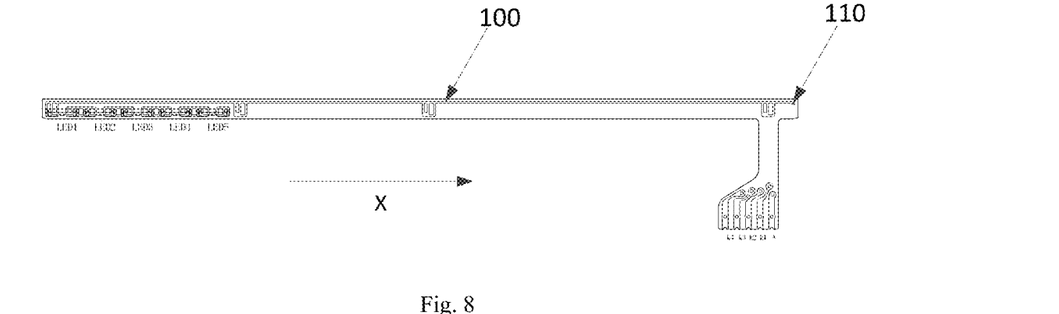
FIG. 8 is a schematic view showing a connection line of a first LED group in an extension direction of the circuit board according to one embodiment of the present disclosure.
Figure 9:
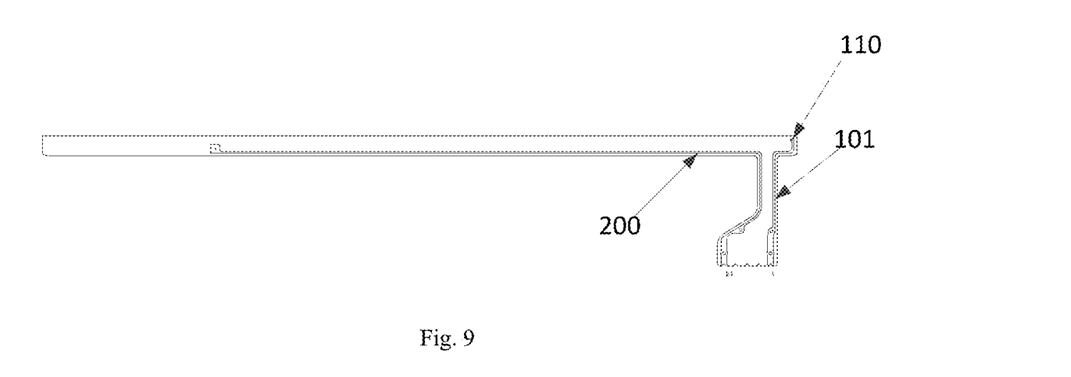
FIG. 9 is a schematic view showing a wiring mode at a back surface in FIG. 8.

In the embodiments of the present disclosure, in addition to the LED group located at a position corresponding to the first position 10, the other three LED groups have a same wiring mode. FIG. 8 and FIG. 9 show a wiring mode of the first LED group in the extension direction (direction X) of the circuit board. A first LED group includes an LED1, an LED2, an LED3, an LED4 and an LED5 in the extension direction of the circuit board, a first electrode of the LED1 is coupled to the positive connection end A through a positive line 100, a second electrode of the LED1 is coupled to a first electrode of the LED2, a second electrode of the LED2 is coupled to a first electrode of the LED3, a second electrode of the LED3 is coupled to a first electrode of the LED4, a second electrode of the LED4 is coupled to a first electrode of the LED5, and a second electrode of the LED5 is coupled to a negative connection end K4 through a negative line 200.

As shown in FIG. 6 to FIG. 9, the circuit board 1 includes a body member 11 extending in the direction X, and a connection member 12 extending from the body member 11 and in a direction perpendicular to the direction X. The connection member 12 and the body member 11 are coupled to each other to form an inverted L shape. A first surface of the body member 11 is provided with the LED1, the LED2, the LED3, the LED4 and the LED5, and the positive line 100 is arranged at the first surface of the body member 11 and extends in the direction X. One end of the positive line 100 is coupled to the first electrode of the LED1, and the other end of the positive line 100 is coupled to a first connection point 110 at an end of the body member 11.

The connection member 12 includes a second surface on a same plane as the first surface and a third surface opposite to the second surface. A first intermediate connection line 101 is arranged on the third surface of the connection member 12, one end of the first intermediate connection line 101 is coupled to the positive connection end A, and the other end of the first intermediate connection line 101 extends in a direction close to the body member 11 and is coupled to a first connection point 110 on the body member 11.

The body member 11 includes a fourth surface opposite to the first surface, and the third surface of the connection member 12 is provided with a negative line 200 coupled to the negative connection end K4. The negative line 200 extends in a direction close to the body member 11 and in a direction X on the fourth surface, and is coupled to a second electrode of the LED5.

Based on the above-mentioned connection mode of the plurality of LEDs between the first negative connection end at the first position 10 and the positive connection end as well as the distribution of the connection lines, it is able to prolong a static electricity transmission path and increase the total resistance. The distribution of the lines and the connection mode of the LEDs at other positions on the circuit board 1 may be different, so as to facilitate the overall distribution of the lines on the circuit board and reduce the quantity of the lines.

As shown in FIG. 6, FIG. 7, FIG. 10, FIG. 11 and FIG. 12, in the embodiments of the present disclosure, the first negative connection end is the last one of the negative connection ends (the negative connection end K1 in the figures) in the extension direction of the circuit board 1. An LED16, an LED17, an LED18, an LED19 and an LED20 are arranged on the first surface of the body member of the circuit board 1 in the direction X, the LED20 is the tail-end LED, and the LED19 and the LED20 are arranged at two opposite sides of the first position where the static electricity is applied. A first electrode of the LED16 is coupled to a second electrode of the LED20, a second electrode of the LED16 is coupled to a first electrode of the LED17, a second electrode of the LED17 is coupled to a first electrode of the LED18, a second electrode of the LED18 is coupled to a first electrode of the LED 19, a second electrode of the LED19 is coupled to the negative connection end K1, and a first electrode of the LED20 is coupled to the positive connection end A.

Figure 11:
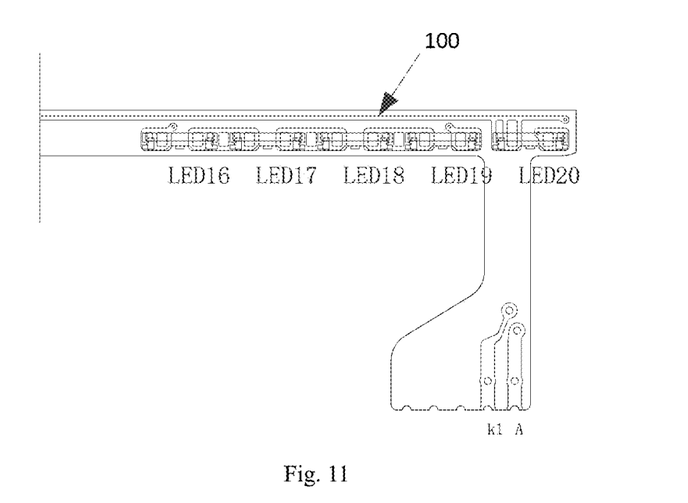
FIG. 11 is a schematic view showing a connection line of a last LED group in the extension direction of the circuit board according to one embodiment of the present disclosure.
Figure 12:
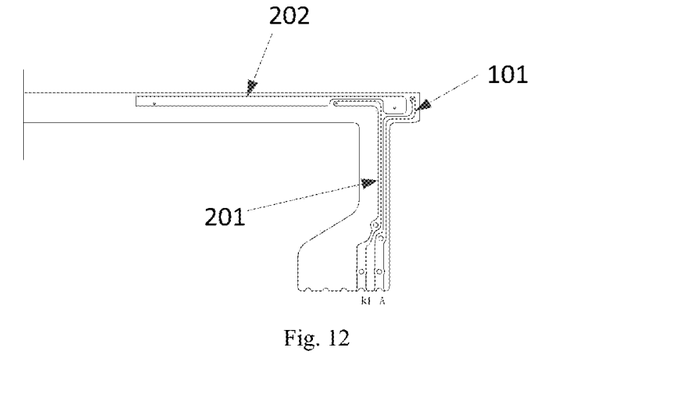
FIG. 12 is a schematic view showing a wiring mode at a back surface of light strip in FIG. 11.

The positive line 100 is arranged on a first surface of the body member of the circuit board 1 and extends in the direction X. The positive line 100 is coupled to a first electrode of the LED20 through an intermediate connection line, and one end of the positive line 100 close to the tail-end of the body member is coupled to the first connection point. The connection member includes a second surface on a same plane as the first surface, and a third surface opposite to the second surface. A first intermediate connection line 101 is arranged on the third surface, one end of the first intermediate connection line 101 is coupled to the positive connection end A, and the other end of the first intermediate connection line 101 extends in a direction close to the body member and is coupled to the first connection point.

A second intermediate connection line 201 coupled to the negative connection end K1 is arranged on the third surface of the connection member, and the second intermediate connection line 201 extends in a direction close to the body member so as to be coupled to a second electrode of the LED19.

The body member includes a fourth surface opposite to the first surface, and the fourth surface is provided with a third intermediate connection line 202 coupled between the first electrode of the LED16 and the second electrode of the LED20.

The present disclosure further provides in some embodiments a backlight module including the above-mentioned light strip.

The present disclosure further provides in some embodiments a display device including the above-mentioned backlight module.

The display device may be any product or member having a display function, such as a liquid crystal television, a liquid crystal display, a digital photo frame, a mobile phone and a tablet computer. The display device further includes a flexible circuit board, a printed circuit board and a back plate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light strip, comprising a circuit board, wherein a plurality of Light-Emitting Diodes (LEDs) is arranged on the circuit board and spaced apart from each other in an extension direction of the circuit board, a positive connection end and a plurality of negative connection ends are arranged on the circuit board, and a plurality of LEDs is coupled between each negative connection end and the positive connection end, wherein each LED comprises a first electrode and a second electrode arranged opposite to each other, the plurality of negative connection ends comprises a first negative connection end, a plurality of LEDs between the first negative connection end and the positive connection end comprises a head-end LED, a tail-end LED and a plurality of intermediate LEDs between the head-end LED and the tail-end LED;

a first electrode of the head-end LED is electrically coupled to a second electrode of the tail-end LED, the first electrode is a positive electrode, and the second electrode is a negative electrode; and the plurality of LEDs between the first negative connection end and the positive connection end comprises a first LED and a second LED arranged at opposite sides of a first position in the extension direction of the circuit board, a second electrode of the first LED is coupled to the first negative connection end, and a first electrode of the second LED is coupled to the positive connection end.

2. The light strip according to claim 1, wherein the first negative connection end is a first one of the negative connection ends or a last one of the negative connection ends in the extension direction of the circuit board.

3. The light strip according to claim 2, wherein the first negative connection end is the first one of the negative connection ends in the extension direction of the circuit board, and the second LED is the head-end LED.

4. The light strip according to claim 2, wherein the first negative connection end is the last one of the negative connection ends in the extension direction of the circuit board, and the second LED is the tail-end LED.

5. The light strip according to claim 2, wherein the positive connection end and the negative connection end are arranged at a same side of the circuit board in the extension direction of the circuit board.

6. The light strip according to claim 1, wherein the plurality of LEDs is arranged at a regular interval on the circuit board in the extension direction of the circuit board.

7. The light strip according to claim 1, wherein the plurality of negative connection ends comprises a second negative connection end different from the first negative connection end, and a plurality of LEDs between the positive connection end and the second negative connection end is sequentially coupled in series in the extension direction of the circuit board.

8. The light strip according to claim 1, wherein a plurality of LEDs is arranged on a first surface of the circuit board, a positive line coupled to the positive connection end is arranged on the first surface, and a plurality of negative lines respectively coupled to the negative connection ends is arranged on a second surface of the circuit board opposite to the first surface.

9. A backlight module, comprising the light strip according to claim 1.

10. A display device, comprising the backlight module according to claim 9.

11. The backlight module according to claim 9, wherein the first negative connection end is a first one of the negative connection ends or a last one of the negative connection ends in the extension direction of the circuit board.

12. The backlight module according to claim 11, wherein the first negative connection end is the first one of the negative connection ends in the extension direction of the circuit board, and the second LED is the head-end LED.

13. The backlight module according to claim 11, wherein the first negative connection end is the last one of the negative connection ends in the extension direction of the circuit board, and the second LED is the tail-end LED.

14. The backlight module according to claim 11, wherein the positive connection end and the negative connection end are arranged at a same side of the circuit board in the extension direction of the circuit board.

15. The backlight module according to claim 9, wherein the plurality of LEDs is arranged at a regular interval on the circuit board in the extension direction of the circuit board.

16. The backlight module according to claim 9, wherein the plurality of negative connection ends comprises a second negative connection end different from the first negative connection end, and a plurality of LEDs between the positive connection end and the second negative connection end is sequentially coupled in series in the extension direction of the circuit board.

17. The backlight module according to claim 9, wherein a plurality of LEDs is arranged on a first surface of the circuit board, a positive line coupled to the positive connection end is arranged on the first surface, and a plurality of negative lines respectively coupled to the negative connection ends is arranged on a second surface of the circuit board opposite to the first surface.

* * * * *